(12) United States Patent
Hall

(10) Patent No.: US 8,638,775 B2
(45) Date of Patent: Jan. 28, 2014

(54) METHOD AND SYSTEM FOR SLEEP MODE SIGNALING FOR A MULTI-STANDARD SYSTEM WITH BLUETOOTH

(75) Inventor: Steven Hall, Olivenhain, CA (US)

(73) Assignee: Broadcom Corporation, Irvine, CA (US)

( * ) Notice: Subject to any disclaimer, the term of this patent is extended or adjusted under 35 U.S.C. 154(b) by 543 days.

(21) Appl. No.: 12/402,284

(22) Filed: Mar. 11, 2009

(65) Prior Publication Data

US 2010/0046498 A1 Feb. 25, 2010

Related U.S. Application Data

(60) Provisional application No. 61/090,110, filed on Aug. 19, 2008.

(51) Int. Cl.
*H04W 4/00* (2009.01)
*H04J 3/00* (2006.01)
*H04B 7/212* (2006.01)
*H04J 3/06* (2006.01)

(52) U.S. Cl.
USPC ........... 370/350; 370/328; 370/337; 370/338; 370/503; 370/504; 370/512; 370/514

(58) Field of Classification Search
None
See application file for complete search history.

(56) References Cited

U.S. PATENT DOCUMENTS

| | | | | | |
|---|---|---|---|---|---|
| 4,745,408 | A | * | 5/1988 | Nagata et al. | 340/7.36 |
| 7,725,118 | B2 | * | 5/2010 | Yang et al. | 455/502 |
| 7,778,226 | B2 | * | 8/2010 | Rayzman et al. | 370/337 |
| 2005/0163088 | A1 | * | 7/2005 | Yamano et al. | 370/338 |
| 2007/0238482 | A1 | | 10/2007 | Rayzman et al. | |
| 2009/0252128 | A1 | * | 10/2009 | Yang et al. | 370/338 |

OTHER PUBLICATIONS

Foreign OA for related Chinese Patent Application mailed Jan. 29, 2012.

* cited by examiner

*Primary Examiner* — Faruk Hamza
*Assistant Examiner* — Diane Lo
(74) *Attorney, Agent, or Firm* — Thomas Horstemeyer, LLP

(57) ABSTRACT

Aspects of a method and system for sleep mode signaling for a multi-standard system with Bluetooth are provided. In this regard, a first communication system that communicates utilizing TDM may generate a synchronization signal that is communicatively coupled to a second communication system that communicates utilizing TDM. The first communication system may determine one or more timeslots during which it may be inactive. The first communication system may control, based on the determination, an amount of time that the synchronization signal is in one or more states. The second communication system may receive the synchronization signal from the first communication system. The second communication system may determine timeslots during which the first communication system may be inactive based on an amount of time that the synchronization signal is in one or more states. The second communication system may transmit and/or receive at times that are scheduled based on the determination.

24 Claims, 6 Drawing Sheets

Dashed lines indicate optionally transmitted Pulses

METHOD AND SYSTEM FOR SLEEP MODE SIGNALING FOR A MULTI-STANDARD SYSTEM WITH BLUETOOTH

CROSS-REFERENCE TO RELATED APPLICATIONS/INCORPORATION BY REFERENCE

This patent application makes reference to, claims priority to and claims benefit from U.S. Provisional Patent Application Ser. No. 61/090,110 filed on Aug. 19, 2008.

The above stated application is hereby incorporated herein by reference in its entirety.

FIELD OF THE INVENTION

Certain embodiments of the invention relate to communications. More specifically, certain embodiments of the invention relate to a method and system for sleep mode signaling for a multi-standard system with Bluetooth.

BACKGROUND OF THE INVENTION

The wireless communications industry has seen explosive growth in recent years and shows no signs of slowing. For example, Bluetooth and WiMAX are technologies that are seeing widespread growth in terms of both numbers and types of compatible devices.

Bluetooth and other standards which utilize time division multiplexing (TDM), such as WiMAX, may operate on closely spaced or even overlapping frequencies. Thus, there may be coexistence issues that confront designers seeking to integrate, or operate in close proximity, Bluetooth systems and other TDM systems. For example, Bluetooth and other standards utilizing TDM, such as WiMAX, operated in close proximity may interfere with each other. In this regard, although Bluetooth and other standards utilizing TDM may utilize spread spectrum techniques to help mitigate the impact of multiple transmitters and/or receivers in close proximity, the performance of Bluetooth and such networks operating in close proximity may nonetheless be degraded. Accordingly, significant opportunities may exist for improving coexistence of Bluetooth and other standards utilizing TDM, and even for benefiting from such coexistence.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sleep mode signaling for a multi-standard system with Bluetooth, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sleep mode signaling for a multi-standard system with Bluetooth. In various embodiments of the invention, a first communication system that communicates utilizing TDM may generate a synchronization signal that is communicatively coupled to a second communication system that communicates utilizing TDM. The first communication system may determine one or more timeslots during which it may be inactive. The first communication system may control, based on the determination, an amount of time that the generated synchronization signal is in one or more states. The second communication system may schedule transmission and/or reception based on the generated synchronization signal. The generated synchronization signal may synchronize the first communication system and the second communication system. The one or more states of the generated synchronization signal may comprise an asserted state, e.g., logic high, and a deasserted state, e.g., logic low. The amount of time that the generated synchronization signal is in one or more states may indicate a number of timeslots during which the first communication system will be inactive. The amount of time the generated synchronization signal is in one or more states during a current timeslot may indicate whether the first communication system may be inactive during a next timeslot. The first communication system may be, for example, a WiMAX or LTE system. The second communication system may be a Bluetooth system.

In various embodiments of the invention, a second communication system that communicates utilizing TDM may receive a synchronization signal from a first communication system that communicates utilizing TDM. The second communication system may determine timeslots during which the first communication system may be inactive based on an amount of time that the received synchronization signal is in one or more states. The second communication system may transmit and/or receive at times that are scheduled based on the determination. The received synchronization signal may synchronize the first communication system and the second communication system. The one or more states of the received synchronization signal may comprise an asserted state, e.g., logic high, and a deasserted state, e.g., logic low. The amount of time the received synchronization signal is in one or more states may indicate a number of timeslots during which the first communication system will be inactive. The amount of time the received synchronization signal is in one or more states during a current timeslot may indicate whether the first communication system may be inactive during a next timeslot. The first communication system may be, for example, a WiMAX or LTE system. The second communication system may be a Bluetooth system.

Figure 1:
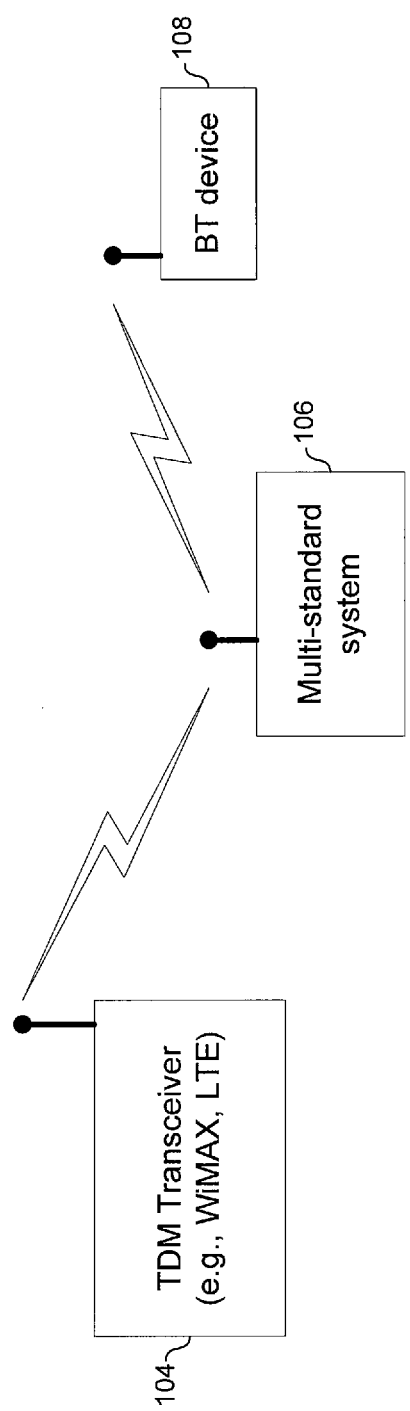
FIG. 1 is a diagram illustrating a multi-radio system communicating with a Bluetooth device and another transceiver which utilizes time division multiplexing (TDM), in accordance with an embodiment of the invention.

FIG. 1 is a diagram illustrating a multi-radio system communicating with a Bluetooth device and another transceiver which utilizes time division multiplexing (TDM), in accordance with an embodiment of the invention. Referring to FIG. 1 there is shown a transceiver 104 which communicates utilizing one or more TDM standards such as WiMAX or 3GPP LTE, a Bluetooth device 108, and a multi-standard system 106 that may communicate in adherence to Bluetooth standards and one or more other standards which utilize TDM.

The transceiver 104 may comprise suitable logic, circuitry, interface(s) and/or code that may be operable to communicate wirelessly utilizing one or more TDM based standards. For example, the transceiver 104 may be operable to transmit during some timeslots and receive during other timeslots. Alternatively, the transceiver 104 may simultaneously transmit and receive during some timeslots and may be inactive during other timeslots. In various exemplary embodiments of the invention, the transceiver 104 may be a cellular or WiMAX base station.

The Bluetooth device 108 may comprise suitable logic, circuitry, interface(s) and/or code for communicating in adherence to Bluetooth standards. The Bluetooth device 108 may be, for example, a wireless headset, a personal computer, or an input or other peripheral device.

The multi-standard system 106 may comprise suitable logic, circuitry, interface(s) and/or code operable to communicate in adherence to Bluetooth standards and at least one other TDM based standard. In various exemplary embodiments of the invention, the multi-standard system 106 may be a single device such as smart phone or a laptop computer or may be a plurality of devices communicatively coupled via one or more wired, wireless, and/or optical links.

In operation, the multi-standard system 106 may be operable to minimize interference between, and/or the necessity for retransmissions by, the transceiver 104, the multi-standard system 106, and/or the Bluetooth device 108. In this regard, the multi-standard system 106 may be enabled to avoid transmitting Bluetooth signals at the same time it is receiving signals from the transceiver 104 and/or avoid transmitting to the transceiver 108 at the same time it is receiving Bluetooth signals. In various embodiments of the invention, one or more signals may be communicated from a first portion of the multi-standard system 106, which enables communication with the transceiver 104, to a second portion of the multi-standard system 106, which enables Bluetooth communications. In one exemplary embodiment of the invention, the amount of time a signal is in a particular state or during a timeslot or sequence of timeslots may indicate timeslots during which the multi-standard system 106 may communicate with the transceiver 104. In another embodiment of the invention, a sequence of states during a timeslot or sequence of timeslots may indicate timeslots during which the multi-standard system 106 may communicate with the transceiver 104. In various embodiments of the invention, a FRAME_SYNC signal input to the Bluetooth subsystem may be utilized to indicate timeslots during which the multi-standard system 106 may communicate with the transceiver 104.

Figure 2:
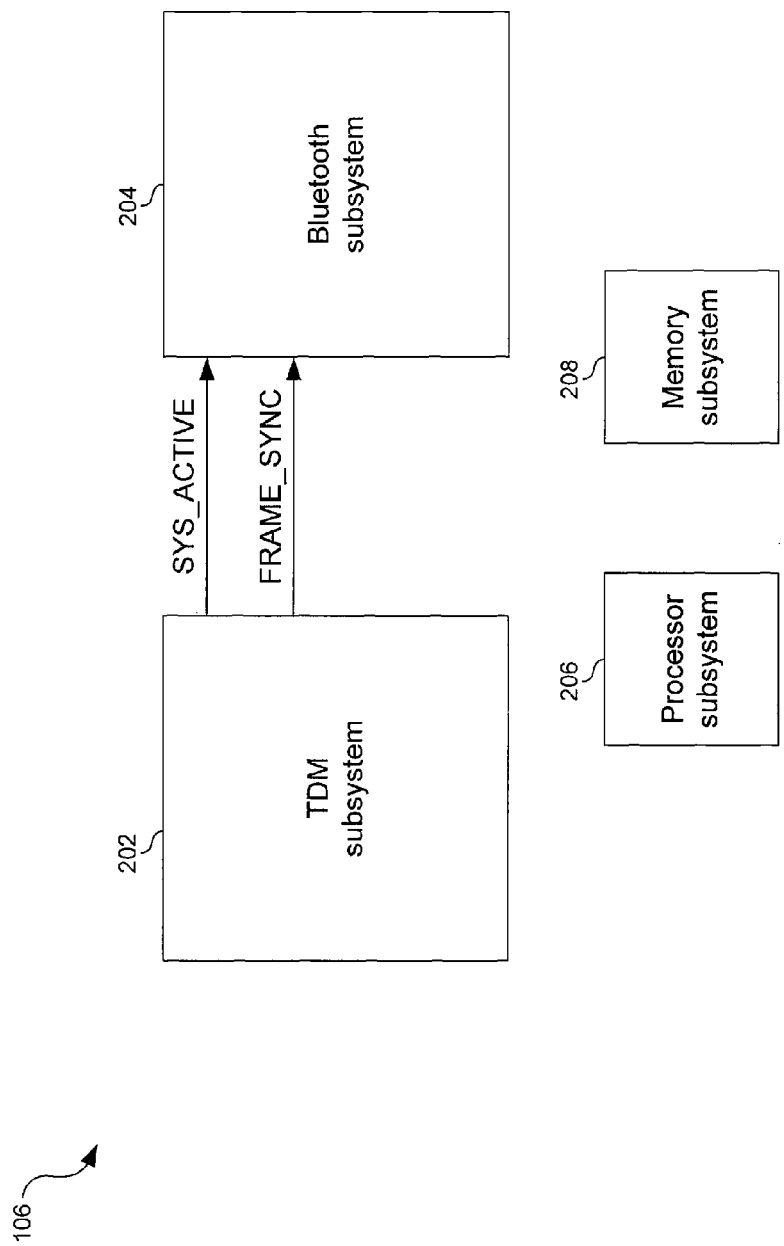
FIG. 2 is a block diagram illustrating an exemplary multi-standard system, in accordance with an embodiment of the invention.

FIG. 2 is a block diagram illustrating an exemplary multi-standard system, in accordance with an embodiment of the invention. Referring to FIG. 2, the system may comprise a TDM subsystem 202, a Bluetooth subsystem 204, a processor subsystem 206, and a memory subsystem 208. In one exemplary embodiment of the invention, the TDM subsystem 202 and the Bluetooth subsystem 204 may be separately housed in close proximity, and may be communicatively coupled via one or more wired, wireless, and/or optical cables. In one exemplary embodiment of the invention, the TDM subsystem 202 and the Bluetooth subsystem 204 may each comprise one or more printed circuit boards (PCBs) within a common housing, and may be communicatively coupled via one or more wires or other inter-PCB connections. In one exemplary embodiment of the invention, the TDM subsystem 202 and the Bluetooth subsystem 204 may each comprise one or more integrated circuits and may be communicatively coupled via one or more traces of a PCB. In one exemplary embodiment of the invention, the TDM subsystem 202 and the Bluetooth subsystem 204 each comprise one or portions of an integrated circuit fabricated on a substrate and may be communicatively coupled via, for example, one or more metal or polysilicon layers.

The TDM subsystem 202 may comprise suitable logic, circuitry, interface(s) and/or code that may be operable to transmit and/or receive signals in accordance with one or more TDM based standards. For example, the TDM subsystem 202 may be operable to communicate with a cellular and/or a WiMAX base stations.

The Bluetooth subsystem 204 may comprise suitable logic, circuitry, interface(s) and/or code that may be operable to transmit and/or receive signals in accordance with Bluetooth standards. For example, the Bluetooth subsystem 204 may be operable to communicate with Bluetooth enabled phones, computers, and/or peripherals.

The processor subsystem 206 may comprise suitable logic, circuitry, interface(s) and/or code that may be operable to process data and/or control one or more operations and/or functions of the multi-standard system 106. In this regard, the processor subsystem 206 may be enabled to provide and/or receive control signals to and/or from the various other portions of the multi-standard system 106. The processor subsystem 206 may also control data transfers between various portions of the multi-standard system 106. Additionally, the processor subsystem 206 may enable execution of applications programs and/or code. In this regard, the applications, programs, and/or code may enable configuring or controlling of operation of the TDM subsystem 202, Bluetooth subsystem 204, and/or the memory subsystem 208. Although the processor subsystem 206 is shown as being separate from the TDM subsystem 202 and the Bluetooth subsystem 204, the invention is not so limited. The processor subsystem 206, and/or functions of the processor subsystem 206, may be implemented in, or performed by, one or both of the TDM subsystem 202 and Bluetooth subsystem 204.

The memory subsystem 208 may comprise suitable logic, circuitry, interface(s) and/or code that may enable storage or programming of information that includes parameters and/or code that may effectuate the operation of the multi-standard system 106. The parameters may comprise configuration data and the code may comprise operational code such as software and/or firmware, but the information need not be limited in this regard. Moreover, the parameters may include adaptive filter and/or block coefficients. Additionally, the memory subsystem 208 may buffer or otherwise store received data and/or data to be transmitted. Although the memory subsystem 208 is shown as a separate subsystem, the invention is not so limited. The memory subsystem 208 and/or functions of the memory subsystem 208 may be implemented in, or performed by, one or both of the TDM subsystem 202 and Bluetooth subsystem 204.

In operation, the TDM subsystem 202 may generate one or more signals which may be utilized to determine when the Bluetooth subsystem 204 should be enabled to transmit signals. In an exemplary embodiment of the invention, the TDM subsystem 202 may be operable to generate a frame synchronization signal, FRAME_SYNC. Transitions in the state of the FRAME_SYNC signal may correspond to boundaries between successive timeslots and may thus enable the Bluetooth to determine the beginning and end of TDM timeslots associated with communications of the TDM subsystem 202. That is, the FRAME_SYNC signal may enable synchronizing or coordinating functions and/or operations of the Bluetooth subsystem 204 to the communication timeslots utilized by the TDM subsystem 202. In this regard, various aspects of the invention may enable altering the FRAME_SYNC signal to indicate active and inactive timeslots.

In various embodiments of the invention, transitions in the state of the FRAME_SYNC signal may be utilized to indicate timeslots during which the TDM subsystem 202 may be active, i.e. receiving and/or transmitting, and/or inactive, i.e. "sleeping". For example, in a particular timeslot, $TS_X$, an amount of time that the FRAME_SYNC signal is asserted may indicate whether the TDM subsystem 202 will be, or is reserving the possibility of, transmitting or receiving during the subsequent timeslot $TS_{X+1}$ and/or one or more later timeslots.

In various embodiments of the invention, the amount of time that the FRAME_SYNC signal is in one or more states may indicate a number of timeslots during which the TDM subsystem 202 may be inactive. In this regard, the number of timeslots may indicate, for example, a number of consecutive inactive timeslots or a number of inactive timeslots that occur in a pattern or sequence known, or determinable, by the Bluetooth subsystem 204. In an exemplary embodiment of the invention, a nominal duration of a state of the FRAME_SYNC signal may be increased by multiplying the nominal duration by a factor related to the number of inactive timeslots, such as is described below with respect to, for example, FIGS. 3A and 3B. For example, a nominal duration δ may be multiplied by K, where K is proportional to a number of inactive timeslots. In another exemplary embodiment of the invention, a nominal duration of a state of the FRAME_SYNC signal may be increased by adding an amount proportional to the number of inactive timeslots to the nominal duration. For example, a duration α*K may be added to a nominal pulse duration δ, where K is proportional to a number of inactive timeslots and α is a unit pulse width.

In various embodiments of the invention, the amount of time that the FRAME_SYNC signal may be in one or more states may indicate a number of timeslots during which the TDM subsystem 202 may be active. In this regard, the number of timeslots may indicate, for example, a number of consecutive active timeslots or a number of active timeslots that occur in a pattern or sequence known, or determinable, by the Bluetooth subsystem 204. In an exemplary embodiment of the invention, a nominal duration of a state of the FRAME_SYNC signal may be increased by multiplying the nominal duration by a factor related to the number of active timeslots, such as is described below with respect to, for example, FIGS. 3A and 3B. For example, a nominal duration .delta. may be multiplied by K, where K is an integer proportional to a number of active timeslots. In another exemplary embodiment of the invention, a nominal duration of a state of the FRAME_SYNC signal may be increased by adding an amount proportional to the number of active timeslots to the nominal duration. For example, a duration α*K may be added to a nominal pulse duration δ, where K is an integer proportional to a number of active timeslots and α is a unit pulse width.

Figure 3A:
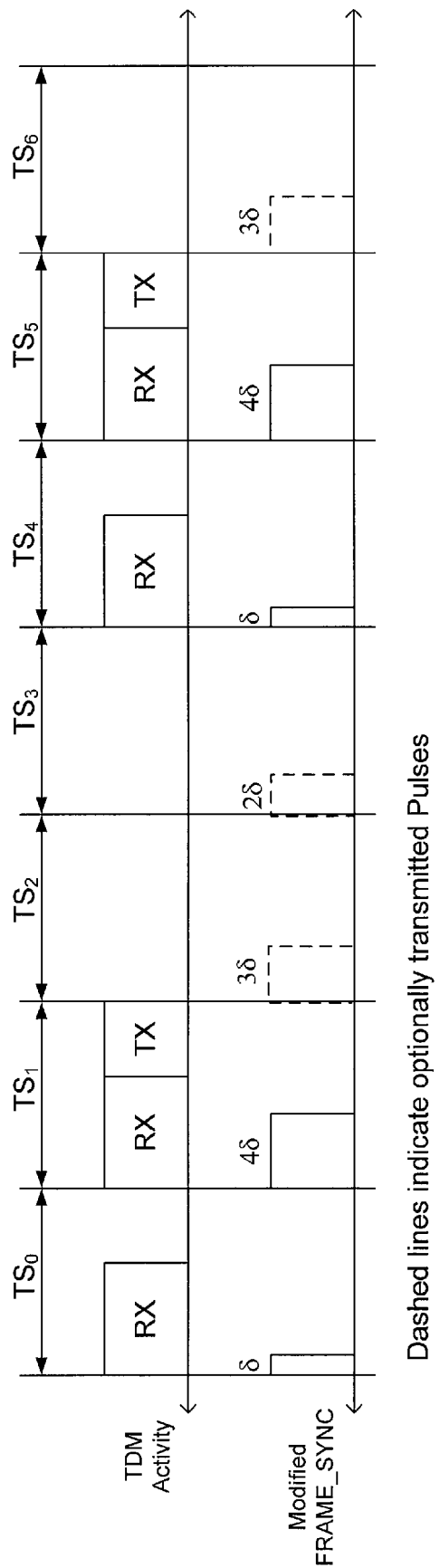
FIG. 3A is a diagram illustrating exemplary behavior of a FRAME_SYNC signal for coordinating transmission and reception by collocated Bluetooth and TDM subsystems, in accordance with an embodiment of the invention.

FIG. 3A is a diagram illustrating exemplary behavior of a FRAME_SYNC signal for coordinating transmission and reception by collocated Bluetooth and TDM subsystems, in accordance with an embodiment of the invention. FIG. 3A is described with reference to the TDM subsystem 202 and the Bluetooth subsystem 204 described with respect to FIG. 2. Referring to FIG. 3A, there is shown a series of TDM timeslots $TS_0, \ldots, TS_6$. Activity of the TDM subsystem 202 during these timeslots is shown on the upper portion of the diagram and the state of the FRAME_SYNC signal is shown on the lower portion of the diagram.

In operation, the FRAME_SYNC signal may be pulsed at the beginning of timeslots during which the TDM subsystem 202 is active, referred to herein as "active timeslots". Additionally, the FRAME_SYNC signal may optionally be pulsed at the beginning of timeslots during which the TDM subsystem 202 is inactive, referred to herein as "inactive timeslots". The duration of a FRAME_SYNC signal pulse, i.e. the duration that the FRAME_SYNC signal is in a particular state, during a timeslot $TS_X$ may indicate whether one or more subsequent timeslots may be inactive or active, where X is an integer. In this regard, a nominal pulse width, δ, may indicate that the next timeslot, $TS_{X+1}$, will be an active timeslot and a pulse wider than δ may indicate the next timeslot will be an inactive timeslot. In one exemplary embodiment of the invention, a FRAME_SYNC signal pulse width of K*δ may indicate that the next active timeslot will occur in K−1 timeslots, where K is an integer greater than or equal to 3. In other words, K*δ may indicate K−2 consecutive inactive timeslots. For example, as shown in FIG. 3A, during $TS_1$ a pulse width of 4*δ may indicate that the next active timeslot occurs 3 timeslots from $TS_1$ during $TS_4$. In various embodiments of the invention, the FRAME_SYNC signal may or may not be pulsed during inactive timeslots. In instances that the FRAME_SYNC signal is pulsed during inactive timeslots, the pulse width may be reduced by δ for each successive timeslot, as shown by dashed lines in FIG. 3A.

Although, the FRAME_SYNC signal is illustrated as being a single signal with positive going pulses, the invention is not so limited. For example, negative going pulses of a single bit FRAME_SYNC signal, a sequence of pulses of the FRAME_SYNC signal, or state transitions of a multi-bit FRAME_SYNC signal may be utilized for coordinating transmission and reception of the TDM subsystem 202 and the Bluetooth subsystem 204.

Figure 3B:
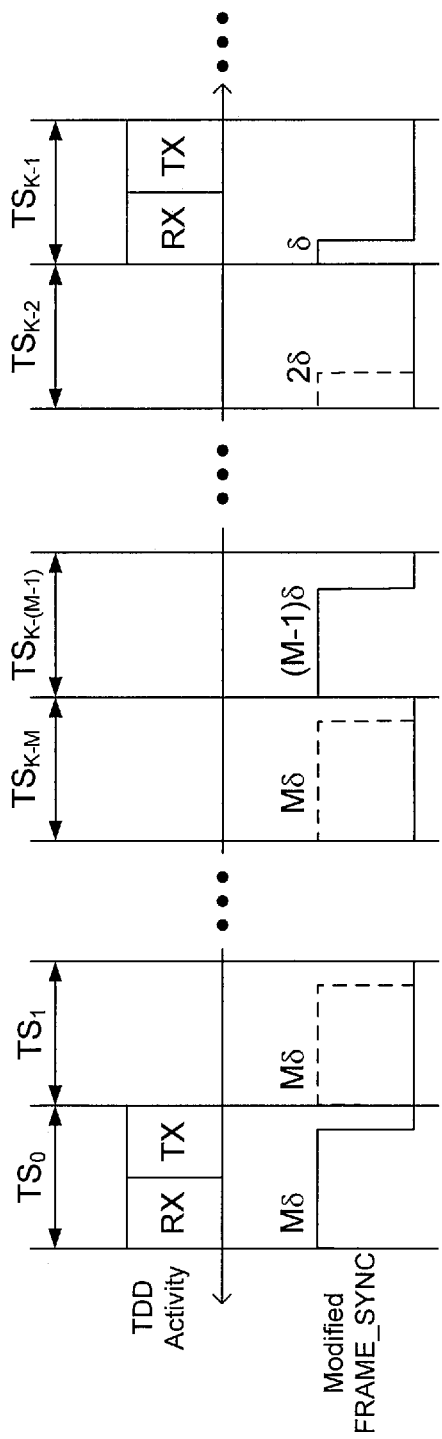
FIG. 3B is a diagram illustrating exemplary behavior of a FRAME_SYNC signal for coordinating transmission and reception by collocated Bluetooth and TDM subsystems for extended periods of TDM subsystem inactivity, in accordance with an embodiment of the invention.

FIG. 3B is a diagram illustrating exemplary behavior of a FRAME_SYNC signal for coordinating collocated Bluetooth and TDM subsystems for extended periods of TDM subsystem inactivity, in accordance with an embodiment of the invention. Referring to FIG. 3B, there is shown a series of TDM timeslots $TS_0, \ldots, TS_{K-1}$. Activity of the TDM subsystem 202 during these timeslots is shown on the upper portion of the diagram and the state of FRAME_SYNC is shown on the lower portion of the diagram.

In operation, multiplying the nominal pulse width, δ, by K, as described above with respect to FIG. 3A, may become infeasible or undesirable when the number of inactive timeslots becomes too large. Accordingly, aspects of the invention may enable defining a threshold, M, and utilizing one or more pulses of width M*δ to indicate a next active timeslot is at least M−1 timeslots away, i.e. that there will be at least M−2 inactive timeslots. The threshold M may be related to K by the relation K=Q*M+R, for K and M each greater than or equal to 3.

For example, as shown in FIG. 3B, the timeslots $TS_1$ to $TS_{K-2}$ may be inactive and K may be greater than M. Accordingly, a FRAME_SYNC signal pulse of width M*δ may be generated during each timeslot $TS_1$ to $TS_{K-M}$. Subsequently, when the remaining number of inactive timeslots is less than or equal to M−2, pulse widths of less than M*δ may be generated. In this regard, during each timeslot $TS_{K-(M-1)}$ to $TS_{K-2}$, the FRAME_SYNC signal pulses, if generated, may have successively narrower widths.

Figure 4A:
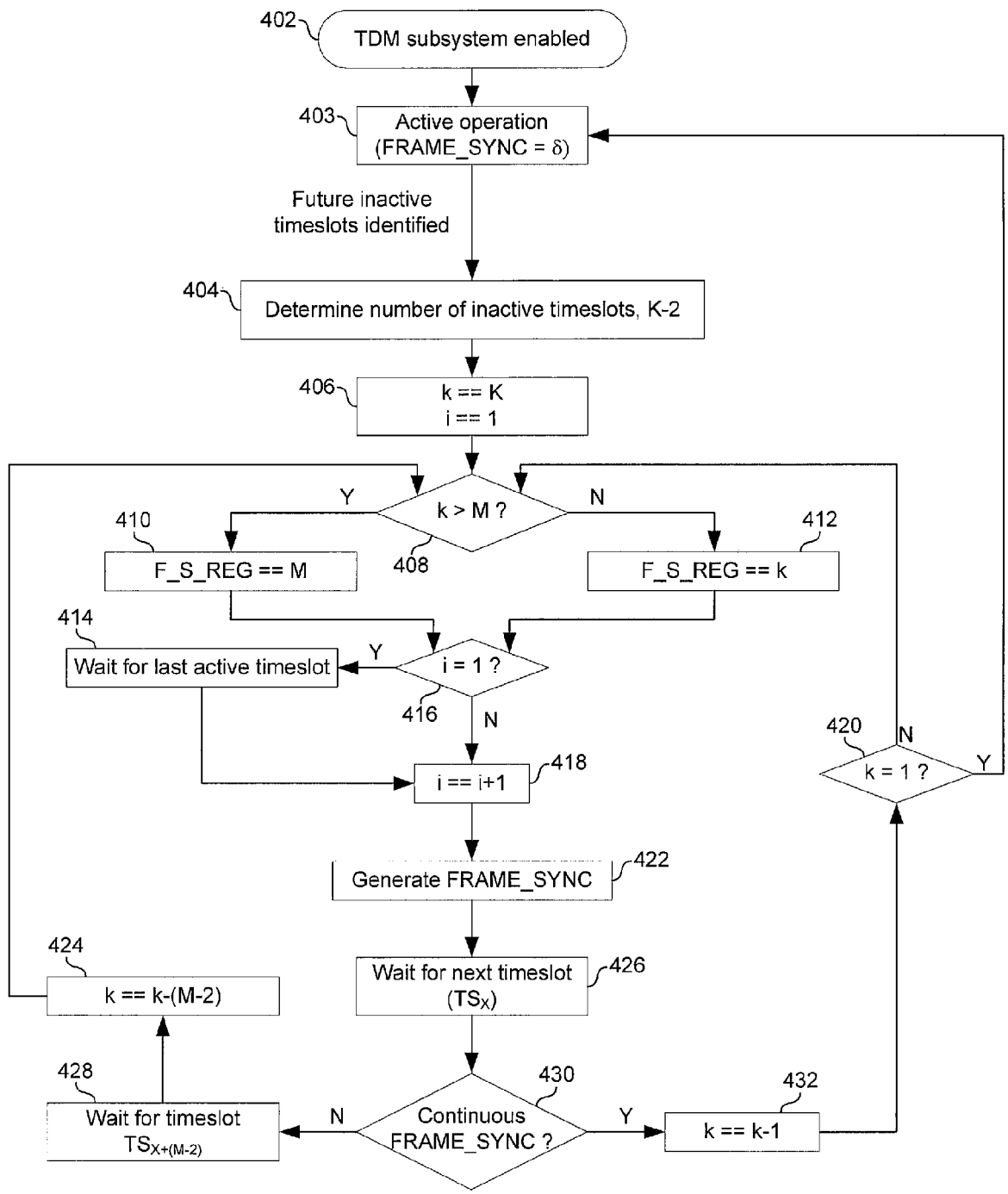
FIG. 4A is a flowchart illustrating exemplary steps for generating FRAME_SYNC signals to coordinate activity of a Bluetooth subsystem collocated with another TDM subsystem, in accordance with an embodiment of the invention.

FIG. 4A is a flowchart illustrating exemplary steps for generating FRAME_SYNC signals to coordinate activity of a Bluetooth subsystem collocated with another TDM subsystem, in accordance with an embodiment of the invention. The exemplary steps are described with reference to the TDM subsystem 202 and the Bluetooth subsystem 204 described with respect to FIG. 2. Referring to FIG. 4A, the exemplary steps may begin with step 402 when the TDM subsystem 202 is enabled or powered up. Subsequent to step 402, the exemplary steps may advance to step 403.

In step 403, the TDM Subsystem may begin generating the FRAME_SYNC signal pulses of nominal duration. In this regard, in a default power-up state, the TDM subsystem 202 may begin transmitting and/or receiving to establish a connection to a remote TDM transceiver. Accordingly, timeslots during and immediately following power-up may be active timeslots. However, upon detecting that one or more inactive timeslots is forthcoming, the exemplary steps may advance to step 404.

In step 404, the TDM subsystem 202 may determine how many inactive timeslots will occur. In this regard, a parameter or register K may be set to the number of inactive timeslots plus 2. Subsequent to step 404, the exemplary steps may advance to step 406.

In step 406, an integer or counter k may be set equal to K and an integer or counter i may be set equal to 1. Subsequent to step 406, the exemplary steps may advance to step 408.

In step 408, it may be determined whether K is greater than the threshold M. In this manner, it may be determined whether the number of inactive timeslots is greater than is possible or desirable to indicate utilizing a single FRAME_SYNC signal pulse. In instances that K is greater than M, the exemplary steps may advance to step 410.

In step 410, the TDM subsystem 202 may set a variable or register, F_S_REG, equal to M. Subsequent to step 410, the exemplary steps may advance to step 416.

In step 416, it may be determined whether the variable or register i is equal to 1. In this manner, it may be determined whether this is the first time the TDM subsystem 202 is executing step 416 for a given inactive timeslot or sequence of timeslots. In instances that i is not equal to 1, the exemplary steps may advance to step 418 where i may be incremented by 1. In instances that i is equal to 1, the exemplary steps may advance to step 414.

In step 414, the TDM subsystem 202 may wait for the last active timeslot of the current sequence of active timeslots. However, the invention is not limited to transmitting widened FRAME_SYNC signals only during a last active timeslot. In various embodiments of the invention, a FRAME_SYNC signal pulse of any width may be generated during any time so long as the TDM subsystem 202 and Bluetooth subsystem 204 are in agreement as to when the pulses may be generated and how the pulses are to be interpreted. Subsequent to step 414, the exemplary steps may advance to step 418, where i may be incremented by 1. Subsequent to step 418, the exemplary steps may advance to step 422.

In step 422, the TDM subsystem 202 may, during the last active timeslot prior to one or more inactive timeslots, generate a FRAME_SYNC signal pulse having a width equal to the value of F_S_REG. Thus, a FRAME_SYNC signal pulse generated in step 422 may have a width of either k*δ or M*δ. Subsequent to step 422, the exemplary steps may advance to step 426.

In step 426, the TDM subsystem 202 may wait for the next timeslot, generically referenced here as $TS_X$, where X is an integer. Subsequent to step 426, the exemplary steps may advance to step 430.

In step 430 it may be determined whether the TDM subsystem 202 desires or is required to generate a FRAME_SYNCH for the active and inactive timeslots. In instances that FRAME_SYNC signal pulses are not generated during all timeslots, the exemplary steps may advance to step 428.

In step 428, the TDM subsystem 202 may wait for timeslot $TS_{X+(M*2)}$, that is, for the timeslot that the Bluetooth subsystem 204 believes, based on the FRAME_SYNC signal pulse generated in step 422, to be the last inactive timeslot. Accordingly, during step 428 the TDM subsystem 202 and/or the Bluetooth subsystem 204 may operate in a low(er) power mode because they are not generating and monitoring, respectively, the FRAME_SYNC signals. Subsequent to step 428, the exemplary steps may advance to step 424.

In step 424, k may be decremented by (M−2) such that k−2 is equal to the remaining number of inactive timeslots, or equivalently, that the next active timeslot is in k−1 timeslots. Subsequent to step 424, the exemplary steps may return to the previously described step 408.

Returning to step 430, in instances that the FRAME_SYNC signal pulses are generated during all timeslots, the exemplary steps may advance to step 432.

In step 432, k may be decremented by 1 such that k−2 is equal to the remaining number of inactive timeslots, or equivalently, that the next active timeslot is in k−1 timeslots. Subsequent to step 432, the exemplary steps may advance to step 420.

In step 420, it may be determined whether k is equal to 1. In instances that k is greater than 1, the exemplary steps may return to the previously described step 408. In this regard, the next active timeslot is still at least one timeslot away. Alternatively, in instances that k is equal to one, the next timeslot is an active timeslot and the steps may return to the previously described step 403.

Figure 4B:
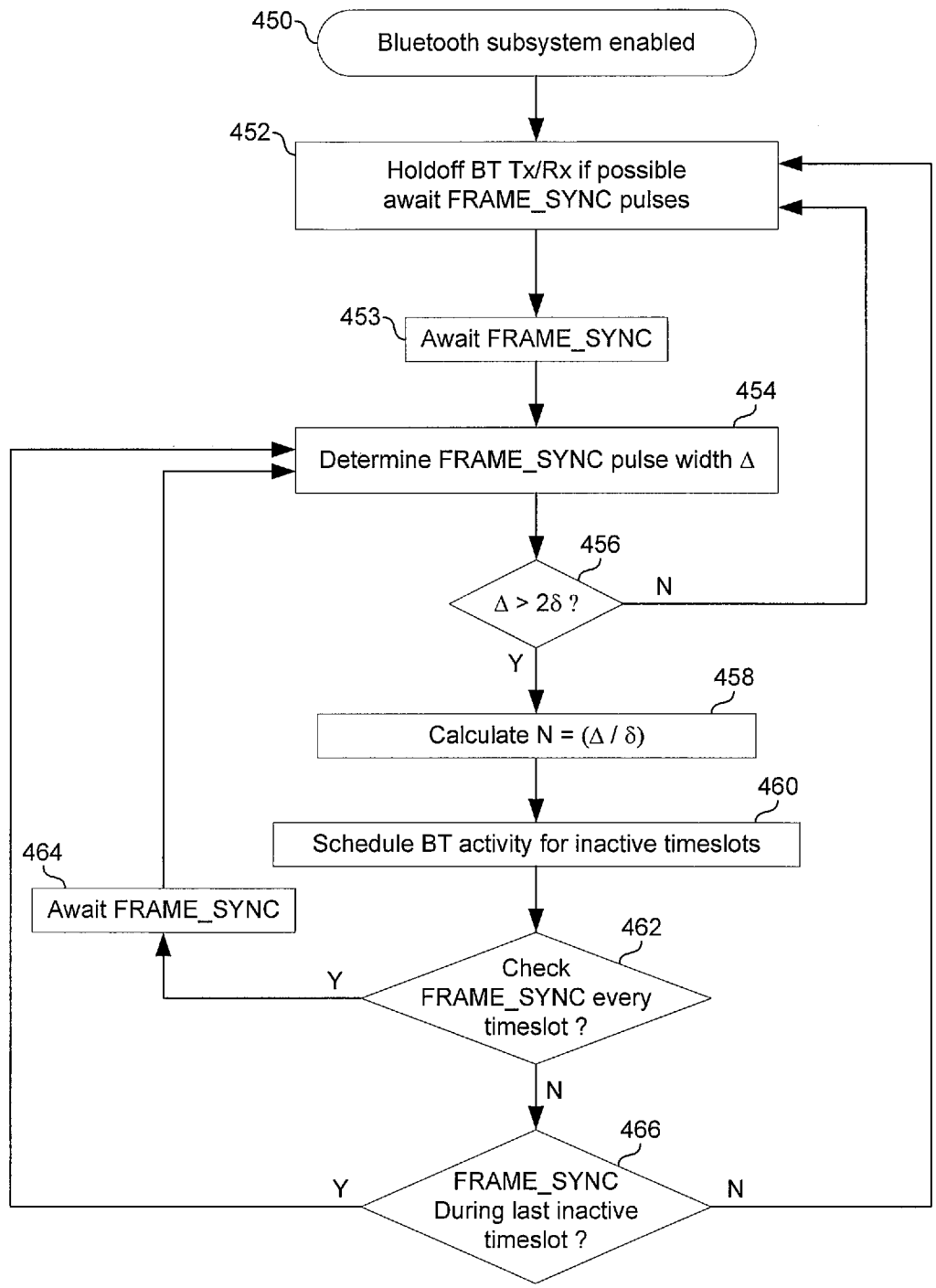
FIG. 4B is a flowchart illustrating exemplary steps for generating FRAME_SYNC signals to coordinate activity of a Bluetooth subsystem collocated with another TDM subsystem, in accordance with an embodiment of the invention.

FIG. 4B is a flowchart illustrating exemplary steps for generating FRAME_SYNC signals to coordinate activity of a Bluetooth subsystem collocated with another TDM subsystem, in accordance with an embodiment of the invention. FIG. 4B is described with reference to the TDM subsystem 202 and the Bluetooth subsystem 204 described with respect to FIG. 2. Referring to FIG. 4B, the exemplary steps may begin with step 450 when the Bluetooth subsystem 204 is enabled or powered up. Subsequent to step 450, the exemplary steps may advance to step 452.

In step 452, the Bluetooth subsystem 204 may hold-off transmissions while the TDM subsystem 202 is active. In this regard, the TDM subsystem 202 may have less control over when it transmits and/or receives than to the Bluetooth subsystem 204. That is to say, the Bluetooth subsystem 204 may be a piconet master and thus may have control over the piconet when it transmits and/or receives. Accordingly, the Bluetooth subsystem 204 may await a FRAME_SYNC signal pulse indicating one or more timeslots during which the TDM subsystem 202 will be inactive. Upon detecting a FRAME_SYNC signal pulse, the exemplary steps may advance to step 454.

In step 454, the Bluetooth subsystem 204 may determine duration, A, of the received FRAME_SYNC signal pulse. For example, the Bluetooth subsystem 204 may be operable to determine a number of clock cycles during which the FRAME_SYNC signal is asserted. In one exemplary embodiment of the invention, detection of a wider than the nominal FRAME_SYNC signal pulse may indicate that the next timeslot may be an inactive timeslot. In other embodiments of the invention, the number of timeslots between the wider FRAME_SYNC signal pulse and the corresponding inactive timeslots may vary, so long as the TDM subsystem 202 and the Bluetooth subsystem 204 are coordinated so as to determine when the inactive timeslots will occur. Subsequent to step 454, the exemplary steps may advance to step 456.

In step 456, it may be determined whether the measured pulse duration A is greater than 2*δ. In other words, it may be determined whether the next active timeslot is more than one timeslot away. In instances that Δ is less than 2*δ, the exemplary steps may return to step 452. In instances that Δ is greater than 2*δ, the exemplary steps may advance to step 458.

In step 458, the value of an integer or register N may be calculated as (Δ/δ). In this regard, if Δ is below a threshold then N may correspond to the integer or register K described above. Similarly, if Δ is above a threshold then N may correspond to the integer or register M described above. Subsequent to step 458, the exemplary steps may advance to step 460.

In step 460, the Bluetooth subsystem 204 may utilize the determined information of when and how many inactive timeslots are forthcoming to schedule Bluetooth communications such that communications by the Bluetooth subsystem 204 and the TDM subsystem 202 interfere with each other as little as possible. Subsequent to step 460, the exemplary steps may advance to step 462.

In step 462, it may be determined whether the FRAME_SYNC signal is monitored during all inactive timeslots. In instances that the FRAME_SYNC signal is monitored, or generates an interrupt, during all inactive timeslots, the exemplary steps may advance to step 464.

In step 464, the Bluetooth subsystem 204 may await the arrival of a FRAME_SYNC signal pulse. Upon detection of a FRAME_SYNC signal pulse, the exemplary steps may return to step 454.

Returning to step 462, in instance that the FRAME_SYNC signal is not monitored, or does not generate an interrupt, during all inactive timeslots, the exemplary steps may advance to step 466.

In step 466, the Bluetooth subsystem 204 may await the last inactive timeslot, that is, the timeslot the Bluetooth subsystem 204 believes to be the last inactive timeslot based on the value of N calculated in step 458. In instances that a FRAME_SYNC signal having a duration greater than 2*δ is received during the last inactive timeslot, the exemplary steps may return to step 454. In instances that no FRAME_SYNC signal wider than 2*δ is received during the last inactive timeslot, the exemplary steps may return to step 452.

Certain aspects of a method and system for sleep mode signaling for a multi-standard system with Bluetooth may be found in various embodiments of the invention. In an exemplary embodiment of the invention, a first communication system 202 that communicates utilizing TDM may generate a synchronization signal, FRAME_SYNC, which is communicatively coupled to a second communication system 204 that communicates utilizing TDM. The first communication system 202 may determine one or more timeslots during which it may be inactive, such as timeslots $TS_2$ and $TS_3$ of FIG. 3A. The first communication system 202 may control, based on the determination, an amount of time that the FRAME_SYNC signal is in one or more states. The second communication system 204 may schedule transmission and/or reception based on the FRAME_SYNC signal. The second communication system 204 that communicates utilizing TDM may receive the FRAME_SYNC signal from the first communication system 202. The second communication system 204 may determine timeslots, $TS_2$ and $TS_3$ of FIG. 3A, for example, during which the first communication system 202 may be inactive, based on an amount of time that FRAME_SYNC is in one or more states. The second communication system 204 may transmit and/or receive at times that are scheduled based on the determination.

The FRAME_SYNC signal may synchronize the first communication system and the second communication system. The one or more states of the FRAME_SYNC signal may comprise an asserted state, e.g., logic high, and a deasserted state, e.g., logic low. The amount of time that the FRAME_SYNC signal is in one or more states may indicate a number of timeslots during which the first communication system 202 will be inactive. The amount of time that the FRAME_SYNC signal is in one or more states during a current timeslot, e.g., $TS_1$ of FIG. 3A, may indicate whether the first communication system 202 may be inactive during a next timeslot, e.g., $TS_2$ of FIG. 3A. The first communication system 202 may be, for example, a WiMAX or LTE system. The second communication system may be a Bluetooth system 204.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for sleep mode signaling for a multi-standard system with Bluetooth.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communications, the method comprising:
   in a first communication system that communicates utilizing time division multiplexing:
   generating a synchronization signal, wherein:
   the generated synchronization signal comprises a first state and a second state, the first state having a first duration proportional to a number of future plural consecutive time slots during which the first communication system will be inactive, the first state indicating the future consecutive time slots; and
   the generated synchronization signal is communicatively coupled to a second communication system that schedules transmission or reception based at least in part on the generated synchronization signal.

2. The method according to claim 1, wherein said generated synchronization signal enables synchronization between said first communication system and said second communication system.

3. The method according to claim 1, wherein the first state comprises the generated synchronization signal being asserted and the second state comprises the generated synchronization signal being deasserted.

4. The method according to claim 1, comprising controlling an amount of time that the generated synchronization signal is in the first state and the second state to indicate a number of timeslots during which the first communication system will be inactive.

5. The method according to claim 1, comprising controlling an amount of time that the generated synchronization signal is in the first state and the second state during a current timeslot to indicate whether a next timeslot will be an active timeslot.

6. The method according to claim 1, wherein said first communication system comprises one of a WiMax and a LTE system, and said second communication system comprises a Bluetooth system.

7. A method for wireless communications, the method comprising:
   receiving, in a second communication system that communicates utilizing time division multiplexing, a synchronization signal from a first communication system that communicates utilizing time division multiplexing, the synchronization signal comprising a first state having a first duration proportional to a number of future plural consecutive time slots during which the first communication system will be inactive, the first state indicating the future plural consecutive time slots;
   determining, in the second communication system the future consecutive time slots during which the first communication system will be inactive based at least in part on an amount of time that the received synchronization signal is in the first state; and
   transmitting or receiving signals by the second communication system at times that are scheduled based at least in part on the determination.

8. The method according to claim 7, wherein said received synchronization signal synchronizes said first communication system and said second communication system.

9. The method according to claim 7, wherein the first state comprises the received synchronization signal being asserted, and the synchronization signal further comprises a second state in which the received synchronization signal being not asserted.

10. The method according to claim 7, comprising determining whether a subsequent timeslot will be an active timeslot based at least in part on the amount of time the received synchronization signal is in the first state during a current timeslot.

11. The method according to claim 7, comprising determining a number of timeslots during which the first communication system will be inactive based at least in part on said amount of time that the received synchronization signal is in the first state.

12. The method according to claim 7, wherein said first communication system comprises one of a WiMax and a LTE system, and said second communication system comprises a Bluetooth system.

13. A system for wireless communications, the system comprising:
   one or more processors, one or more circuits, or any combination thereof for use in a first communication system that communicates utilizing time division multiplexing, operable to:
   generate a synchronization signal, wherein:
   the generated synchronization signal comprises a first state and a second state, the first state having a first duration proportional to a number of future plural consecutive time slots during which the first communication system will be inactive, the first state indicating the future consecutive time slots; and
   the generated synchronization signal is communicatively coupled to a second communication system that schedules transmission or reception based at least in part on the generated synchronization signal.

14. The system according to claim 13, wherein said generated synchronization signal enables synchronization between said first communication system and said second communication system.

15. The system according to claim 13, wherein the first state comprises the generated synchronization signal being asserted and the second state comprises the generated synchronization signal being deasserted.

16. The system according to claim 13, wherein the one or more processors or circuits are operable to control an amount of time that the generated synchronization signal is in the first state and the second state to indicate a number of timeslots during which the first communication system will be inactive.

17. The system according to claim 13, wherein the one or more processors or circuits are operable to control an amount of time that the generated synchronization signal is in the first state and the second state during a current timeslot to indicate whether a next timeslot will be an active timeslot.

18. The system according to claim 13, wherein said first communication system comprises one of a WiMax and a LTE system, and said second communication system comprises a Bluetooth system.

19. A system for wireless communications, the system comprising:
   one or more processors, one or more circuits, or any combination thereof for use in a second communication system that communicates utilizing time division multiplexing, operable to:
   receive a synchronization signal from a first communication system that communicates utilizing time division multiplexing, the synchronization signal comprising a first state having a first duration corresponding to future plural consecutive time slots during-which the first communication system will be inactive the first state indicating the future consecutive time slots;

determine the future timeslots during which the first communication system will be inactive based at least in part on an amount of time that the received synchronization signal is in the first state; and transmit or receive signals at times that are scheduled based at least in part on the determination.

20. The system according to claim 19, wherein said received synchronization signal synchronizes said first communication system and said second communication system.

21. The system according to claim 19, wherein the first state comprises the received synchronization signal being asserted, and the synchronization signal further comprises a second state in which the received synchronization signal being not asserted.

22. The system according to claim 19, wherein said one or more processors or circuits are operable to determine whether a subsequent timeslot will be an active timeslot based at least in part on the amount of time the received synchronization signal is in the first state during a current timeslot.

23. The system according to claim 19, wherein the one or more processors or circuits are operable to determine a number of timeslots during which the first communication system will be inactive based at least in part on said amount of time that the received synchronization signal is in the first state.

24. The system according to claim 19, wherein said first communication system comprises one of a WiMax and a LTE system, and said second communication system comprises a Bluetooth system.

* * * * *